United States Patent
Bernard et al.

(10) Patent No.: US 7,095,955 B2
(45) Date of Patent: Aug. 22, 2006

(54) SYSTEM AND METHOD FOR PERFORMANCE MONITORING IN A PASSIVE OPTICAL NETWORK

(75) Inventors: Marc R. Bernard, Pembroke Pines, FL (US); Kerry J. Neef, Weston, FL (US); Andrew E. Khaleel, Sunrise, FL (US)

(73) Assignee: Advanced Fibre Communications Inc., Petaluma, CA (US)

( * ) Notice: Subject to any disclaimer, the term of this patent is extended or adjusted under 35 U.S.C. 154(b) by 48 days.

(21) Appl. No.: 10/767,413

(22) Filed: Jan. 28, 2004

(65) Prior Publication Data

US 2005/0163504 A1 Jul. 28, 2005

(51) Int. Cl.
*H04B 10/08* (2006.01)
(52) U.S. Cl. ............... 398/16; 398/58; 398/63
(58) Field of Classification Search .......... 398/9–38, 398/58–64
See application file for complete search history.

(56) References Cited

U.S. PATENT DOCUMENTS 5,600,632 A * 2/1997 Schulman ............... 370/252
2002/0171895 A1* 11/2002 Chang ...................... 359/168

* cited by examiner

Primary Examiner—David C. Payne
(74) Attorney, Agent, or Firm—Pillsbury Winthrop Shaw Pittman LLP (57) ABSTRACT

Networks and networks for performance monitoring (PM) in a passive optical network, which contain at least one optical line terminator (OLT) and at least one optical network terminal (ONT), provide increased PM flexibility over traditional ONT management and control interface functionality. These networks and networks include setting a PM initialization time at the ONT, maintaining a base PM time at the ONT, zeroing an interval end time counter at the ONT and collecting a first set of PM data in PM bins for a specified PM time interval. The interval end time counter can sequentially increment after completing collection the first set of PM data. Once collection of the first set of PM data is complete and the interval end time counter has been incremented, these networks and networks can collect more sets of PM data in other PM bins for the PM time interval. Once PM data are collected, the OLT can retrieve the PM initialization time and the base PM time from the ONT, as well as the PM data from the PM bins. The OLT can retrieve any of the sets of PM data that were collected during PM data collection. For collecting non-current sets of PM data, the OLT can use the PM initialization time and the base PM time, together with the current network time, to determine a PM bin offset used to identify the appropriate PM bin from which to retrieve the sought-after PM data.

55 Claims, 6 Drawing Sheets

SYSTEM AND METHOD FOR PERFORMANCE MONITORING IN A PASSIVE OPTICAL NETWORK

BACKGROUND OF THE INVENTION

1. Field of the Invention

Generally, the present invention relates to a passive optical network (PON). More specifically, the present invention relates to a system and method of using optical line terminator (OLT) system time during optical network terminal (ONT) performance monitoring (PM) on the PON.

2. Description of the Related Art

Most networks in the telecommunications networks of today are based on active components at the serving office exchange and termination points at the customer premises as well as in the repeaters, relays and other devices in the transmission path between the exchange and the customer. In this context, active components are devices that require power of some sort, and generally comprise processors, memory chips and other devices that are active and processing information within and along the transmission path.

In contrast, within a typical passive optical network (PON), all active components between the central office exchange and the customers' premises are eliminated, and passive optical components are put into the network to guide traffic based on splitting the power of optical wavelengths to endpoints along the way. This replacement of active components with passive components provides a cost-savings to service providers by eliminating the need to power and service active components in the transmission loop. The passive splitters or couplers are merely devices working to pass or restrict light, and as such, have no power or processing requirements.

In general, a typical PON consists of an optical line terminator (OLT), which is located at a central office (CO), and a set of associated optical network terminals (ONTs), which are located at customers' premises. Between the OLT and the ONTs lies optical distribution networks (ODNs), which includes fibers and one or more of passive splitters and passive couplers. An exemplary PON is described in the International Telecommunication Union Recommendation, ITU-T Recommendation G.983.1, which is incorporated by reference in its entirety and for all purposes.

Figure 1:
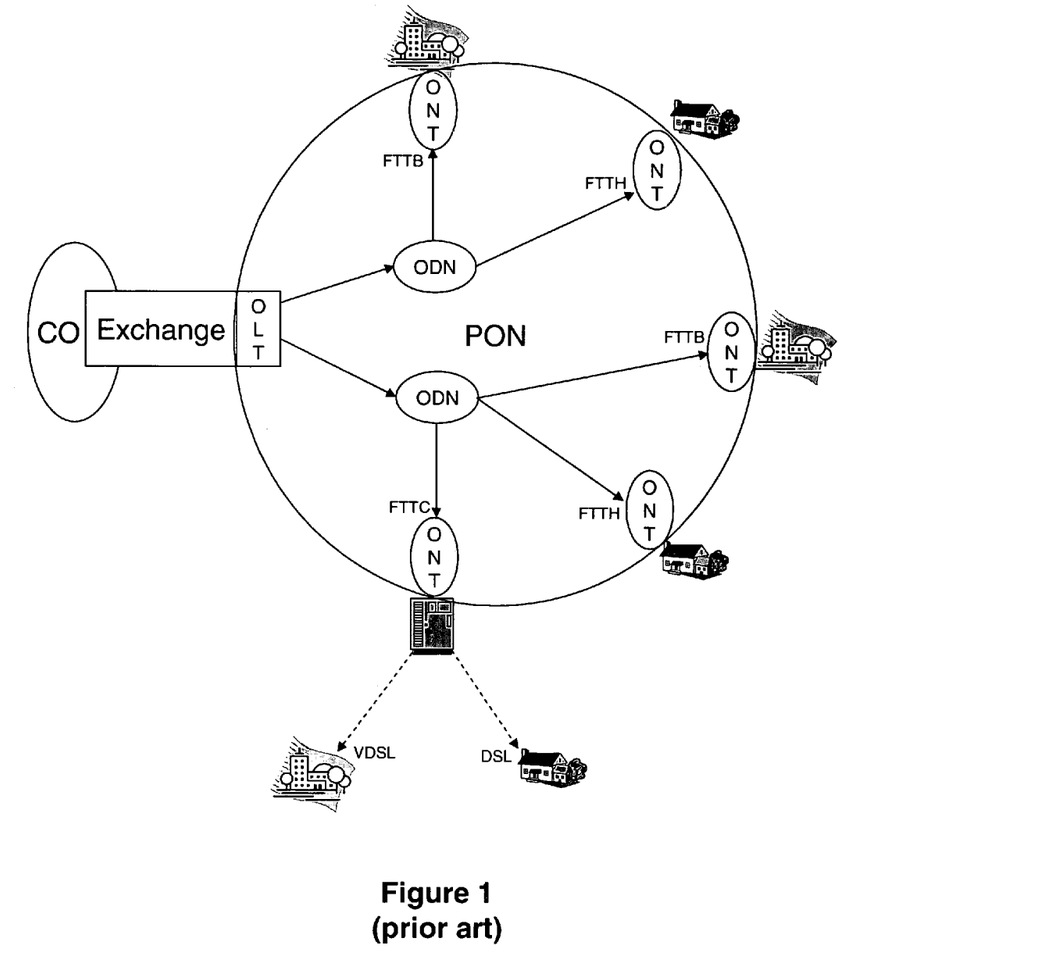
FIG. 1 illustrates a typical PON as is known in the art.

FIG. 1 illustrates a typical PON. As shown in FIG. 1, in a PON network, fiber can be run from the CO exchange, via an OLT, to an ODN, and then individual fiber strands to each ONT at a building, home or other serving equipment. Each fiber from the OLT can be can be split from the using passive splitters and/or couplers. This allows for an expensive piece of fiber cable from the CO exchange to be shared among many customers, thereby dramatically lowering the overall costs of deployment for fiber to the business (FTTB), fiber to the home (FTTH), and fiber to the curb (FTTC) applications. The alternative would be to run individual fiber or copper strands from the exchange to each customer, which results in a much higher serving cost per customer.

The main fiber run on a PON network can operate at 155 Mps, 622 Mbps, 1.25 Gbps or 2.5 Gbps the various PON standards. Bandwidth allocated to each customer from this aggregate bandwidth can be static or dynamically assigned in order to support voice, data and/or video applications. With PON, a single fiber from the CO exchange can service 16, 32 or more buildings through the use of both passive devices to split the optical signal, and PON protocols to control the sending and transmission of signals across the shared access facility.

In the typical PON, the process of transporting data downstream to the customer premises is different from transporting data upstream from the customer premises. Downstream data is broadcasted from the OLT to each ONT, and each ONT processes the data destined to it by matching the address at the protocol transmission unit header. Upstream traffic is more complicated due to the shared media nature of the ODN. There is a need to coordinate between the transmissions of each of the ONTs to the OLT in order to avoid collisions. Upstream data is transmitted according to control mechanisms in the OLT, in which dedicated transmission time slots are granted to each individual ONT. The time slots are synchronized so that transmission bursts from different ONTs do not collide.

Figure 2:
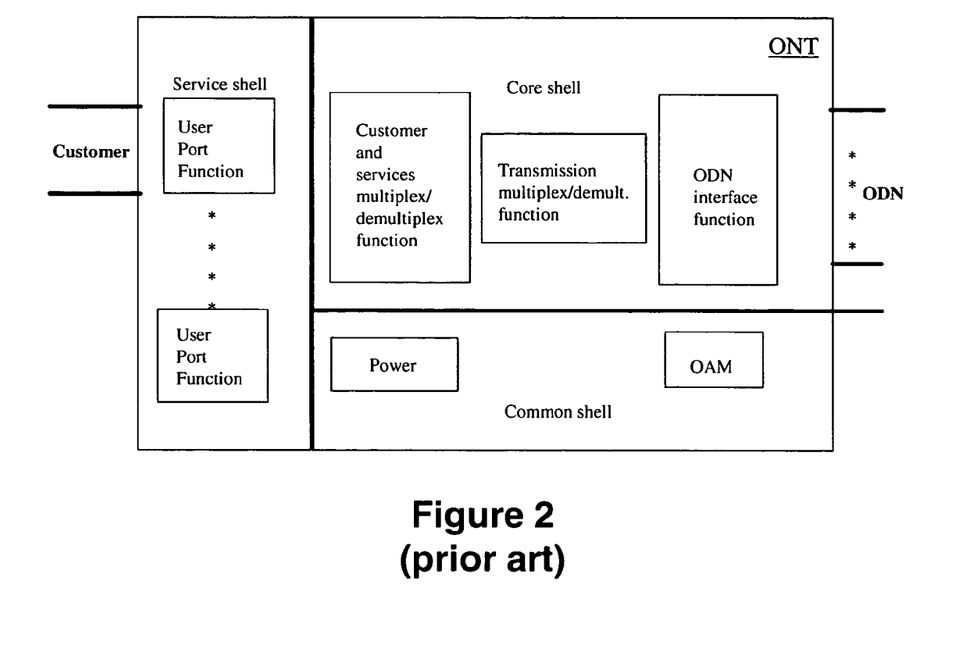
FIG. 2 illustrates a typical ONT at a customer's location within the PON of today.

FIG. 2 illustrates a typical ONT at a customer's location within the PON of today. In the example of FIG. 2, the ONT is active and decouples the access network delivery mechanism, at the core shell, from the in-house distribution, at the service shell. The ONT core shell consists of ODN interface, User Port, Transmission, Services and Customers Multiplexing (MUX)/de-multiplexing functions. The ONT common shell includes power and Operations, Administration and Maintenance (OAM).

Figure 3:
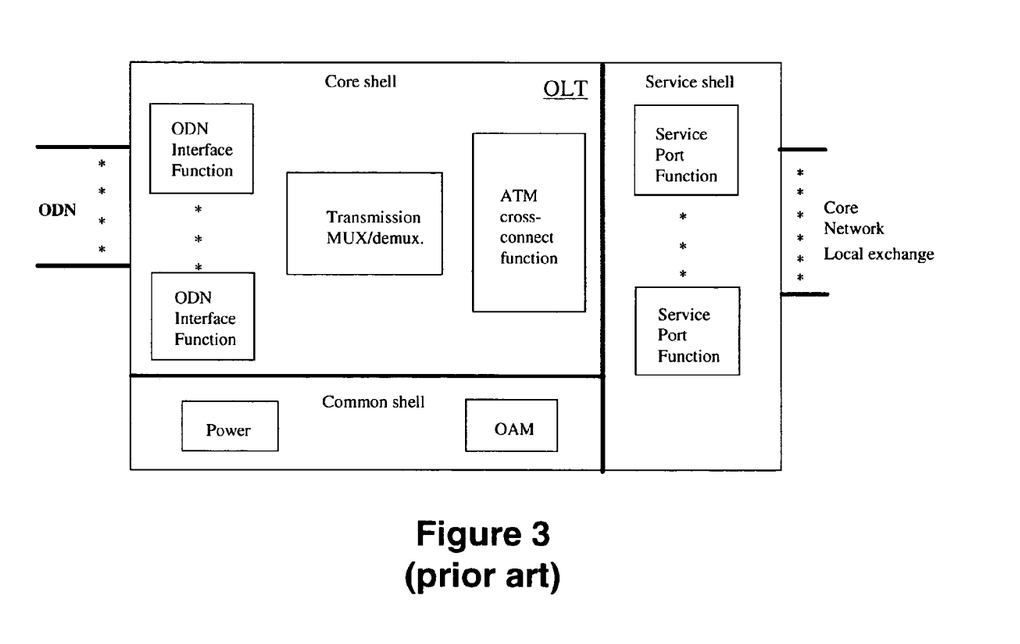
FIG. 3 illustrates an exemplary OLT of the typical PON of today.

FIG. 3 illustrates an exemplary OLT of the typical PON of today. As shown in FIG. 3, the OLT service shell is connected to the switched networks via standardized interfaces at the exchange. At the distribution side, the OLT core shell presents optical accesses according to the agreed requirements, in terms of bit rate, power budget, and the like. The OLT common shell, much like the ONT, includes power and Operations, Administration and Maintenance (OAM).

Figure 4:
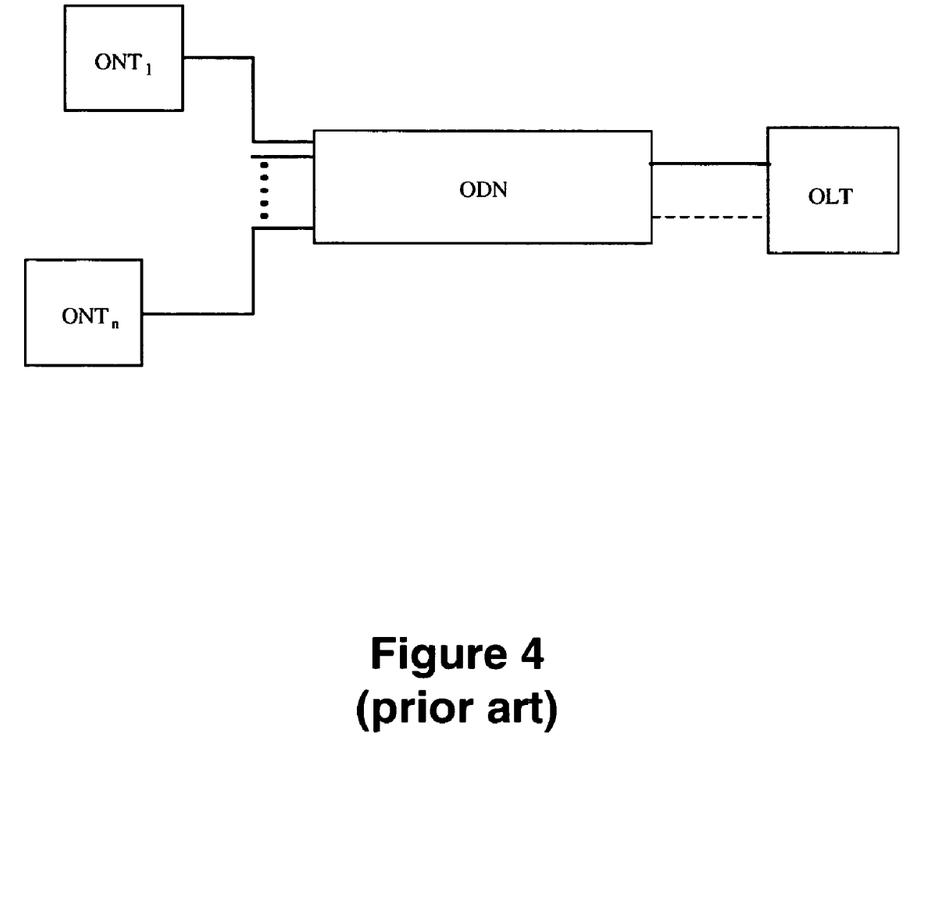
FIG. 4 illustrates a typical ODN connection between the OLT and one or more ONTs of the typical PON of today.

In general, the Optical Distribution Network (ODN) provides the optical transmission medium for the physical connection of the ONTs to the OLTs. Individual ODNs may be combined and extended through the use of optical amplifiers. FIG. 4 illustrates a typical ODN connection between the OLT and one or more ONTs of the typical PON of today.

Part of the OAM function of the OLTs and ONTs of the typical PON includes an element management system (EMS), which includes performance management (or, performance monitoring). Specifically, OAM of the ONT includes the ONT management and control interface (OMCI) functions. An exemplary OMCI for a typical PON is described in the International Telecommunication Union Recommendation, ITU-T Recommendation G.983.2, which is incorporated by reference in its entirety and for all purposes. However, existing OMCI standards (such as, for example, G.983.2) do not communicate system time to an ONT, do not provide the ability to send an OLT's system time to the ONT and ultimately, do not provide the ability to associate a time with the performance monitoring bins (e.g. 15-minute collection time periods) collected and reported by the ONTs.

Thus, what is needed is a method and system that provides the ability to send an OLT's system time to an ONT, and then associate this system time with PM bins collected and reported by the ONT to the OLT within a PON.

SUMMARY

The present invention relates to systems and methods for performance monitoring (PM) in passive optical networks. Passive optical networks generally include at least one optical line terminator (OLT) and at least one optical network terminal (ONT). The systems and methods of the present invention include setting a PM initialization time at the ONT, maintaining a base PM time at the ONT, zeroing an interval end time counter at the ONT and collecting a first set of PM data in one of several PM bins for a specified PM time interval.

In one aspect of the present invention, the interval end time counter can sequentially increment after completing collection the first set of PM data for the particular time interval. In this aspect, the interval end time counter can be a cyclic counter. Once collection of the first set of PM data is complete and the interval end time counter has been incremented, the system and method can collect more sets of PM data in other PM bins for the PM time interval. This aspect can be repeated by successively incrementing the interval end time counter and collecting more sets of PM data in other PM bins for the PM time interval.

Once PM data are collected, the systems and methods of the present invention then allows the OLT to retrieve the PM initialization time and the base PM time from the ONT, as well as the PM data from the PM bins. The OLT can collect any one or all of the sets of PM data that were collected during PM data collection. For collecting non-current sets of PM data, this aspect of the present invention can use the PM initialization time and the base PM time, together with the current system time, to determine a PM bin offset used to identify the appropriate bin from which to retrieve the sought-after PM data.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 5:
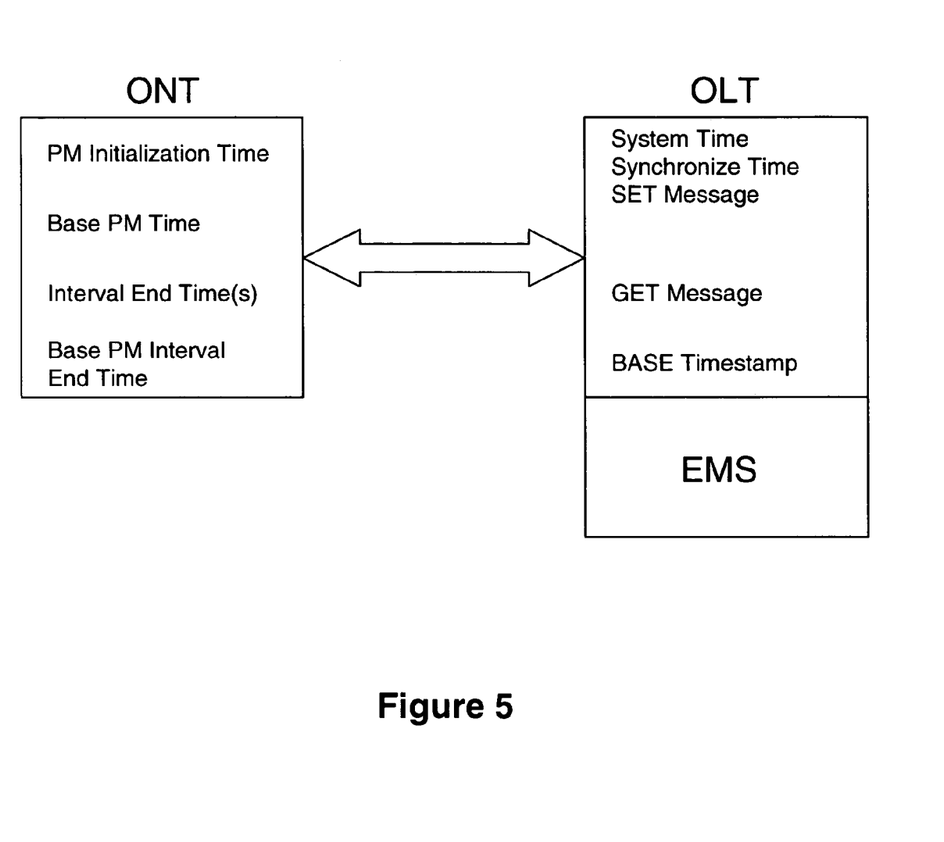
FIG. 5 illustrates an exemplary ONT and OLT according to an embodiment of the present invention.

The present invention presents a method and system for providing the ability to send an OLT's system time to an ONT, and then associate this system time with PM bins (or buckets) collected and reported by the ONT to the OLT within a PON. The details of the ONT performance monitoring (PM) of the present invention describe attributes that can be available from the element manager system (EMS) of the PON. FIG. 5 illustrates an exemplary ONT and OLT according to an embodiment of the present invention.

As shown in FIG. 5, the ONT of the present invention can maintain a "PM Initialization Time" which can be equivalent to either one of [a] the system time that the ONT receives from the OLT after first being ranged, or [b] the system time when the ONT receives a request from the OLT to initialize all PM Counters, for example, via the G.983.2 compliant "Synchronize Time" message. To facilitate this embodiment, the OLT, for each Management Entity (ME) might include a "SET Message" to allow the OLT to send the System Time to the ONT, after the ONT has been ranged and during system updates.

According to an embodiment of the present invention, the ONT might also maintain a "Base PM Time" attribute, which can store the most recent 15-minute bucket time (i.e., since 1992, this bucket time is noted in seconds; but any time standard could suffice) with respect to the "PM Initialization time" for the ONT. For example, if the ONT receives the system time from the OLT at 8:50 A.M., the most recent 15-minute bucket would be the 8:45–9:00 A.M. bucket. Thus, the "Base PM Time" would store 8:45 A.M. (i.e., in seconds since 1992).

As further shown in FIG. 5, according to an embodiment of the present invention, the ONT can also maintain, for each Management Entity (ME) (i.e., in this context, an ME is any abstract representation of resources and services in an ONT), a cyclic "Interval End Time" counter that can increment by 0x01 upon the completion of each successive 15-minute interval (i.e., bucket time interval).

This "Interval End Time" attribute can identify the most recently finished 15-minute interval. It can be, therefore, a cyclic counter (modulo 0x20 (32)) that is incremented each time a new interval is finished, when the attribute counters are updated. For example, the value of this attribute might be 0x00 during the first 15-minute interval that starts with the reception of the "synchronize time" action. The value is 0x01 during the first period after this, and so on. If this managed entity is created after the reception of the "synchronize time" action, the value of this attribute is set equal to the number of the last completed interval. The actual counters of this managed entity start counting directly. The attribute counters are updated at the end of each interval.

According to an aspect of this embodiment, the "Interval End Time," when implemented as a counter, can be set to one of the following values to indicate the given PM data description:

| Value | Description |
|---|---|
| 0–31 | One of the 15-Min Buckets contained within the previous 8 hours of PM collection. |
| 255 | PM Data for the Current Day |
| 254 | (1) PM Data for the Previous Day |
| 253 | (2) PM Data for the Prior Previous Day before (1) |
| 252 | (3) PM Data for the Prior Previous Day before (2) |

Further to this example, the "synchronize time" action, discussed above, is used to synchronize the start time of all Monitoring managed entities of the ONT with the reference time of the OLT and to reset the registers of the Monitoring managed entities. The effect of this action is that all counters of all Monitoring managed entities are set to 0x00 and restart counting. Also, the value of the "Interval End Time" attribute of each Monitoring managed entities is set to 0×00 and restarts counting. These counters can be reset at the EMS.

According to a further embodiment of the present invention, the ONT can maintain a "Base PM Interval End Time" attribute that might store the value of 15-min interval applicable to the "Base PM Time" attribute. After 8 hours of continuous PM collection, the ONT can manipulate the "Base PM Interval End Time" in one of at least two ways. First, the ONT can increment the "Base PM Time" by 15-minutes (e.g. in seconds since 1992) after the completion of each 15-min bucket. Second, the ONT can increment the "Base PM Interval End Time" by 1 after the completion of each 15-min bucket.

PM collection according to the present invention, for example with referencing FIG. 5, might be implemented in connection with a standard OMCI in a PON. This exemplary implementation would involve updating the ME to include the have BASE PM Time (e.g., 4 bytes) and Base PM Interval Time (e.g., an incremental counter). Additionally in this example, that ME can include a SET Message used by the OLT to send the System Time to the ONT. Once initialized, the ONT might not begin PM Collection until it has knowledge of the system time. Once PM Collection begins, according to this example, the ONT can use 32 bins (e.g., wrapping counters) to count the different 15-min intervals.

For retrieval and display of PM Collection data according to this exemplary implementation, the EMS can first use the GET Message to retrieve the Base PM Time and the associated Base PM Time Interval. Based on these values, the EMS will have enough knowledge to display the PM BINS for the given Interval. The EMS can next request the BASE Time, thereby getting all of the applicable ME attributes, and at the end of the first GET, can issue another GET to retrieve the BASE Time. If the two BASE Times (from the two GET requests) no longer match, then the system time surpassed a 15-min bin period during the collection process. The EMS can, in this case, perform one of at least two functions. The EMS can, for example, simply discard the collected data and start from scratch with the new bin. This can be the simplest, but most time consuming handling of this behavior. The EMS could, alternatively, go ahead and request the most recent 15-min Bin from the ONT (i.e., which would likely be the 33rd 15-min BIN for this 32-bin implementation), and discard the very first 15-min bin, because this very first 15-min bin will now be outside of the 8-hour window (discussed in further detail below). Note that in this exemplary embodiment, if there is less than 8 hours of total PM collection being reported by the ONT to the OLT (e.g. from the Base time PM interval to the most recent interval), then the EMS would want to keep the very first 15-min bin reported.

Figure 6:
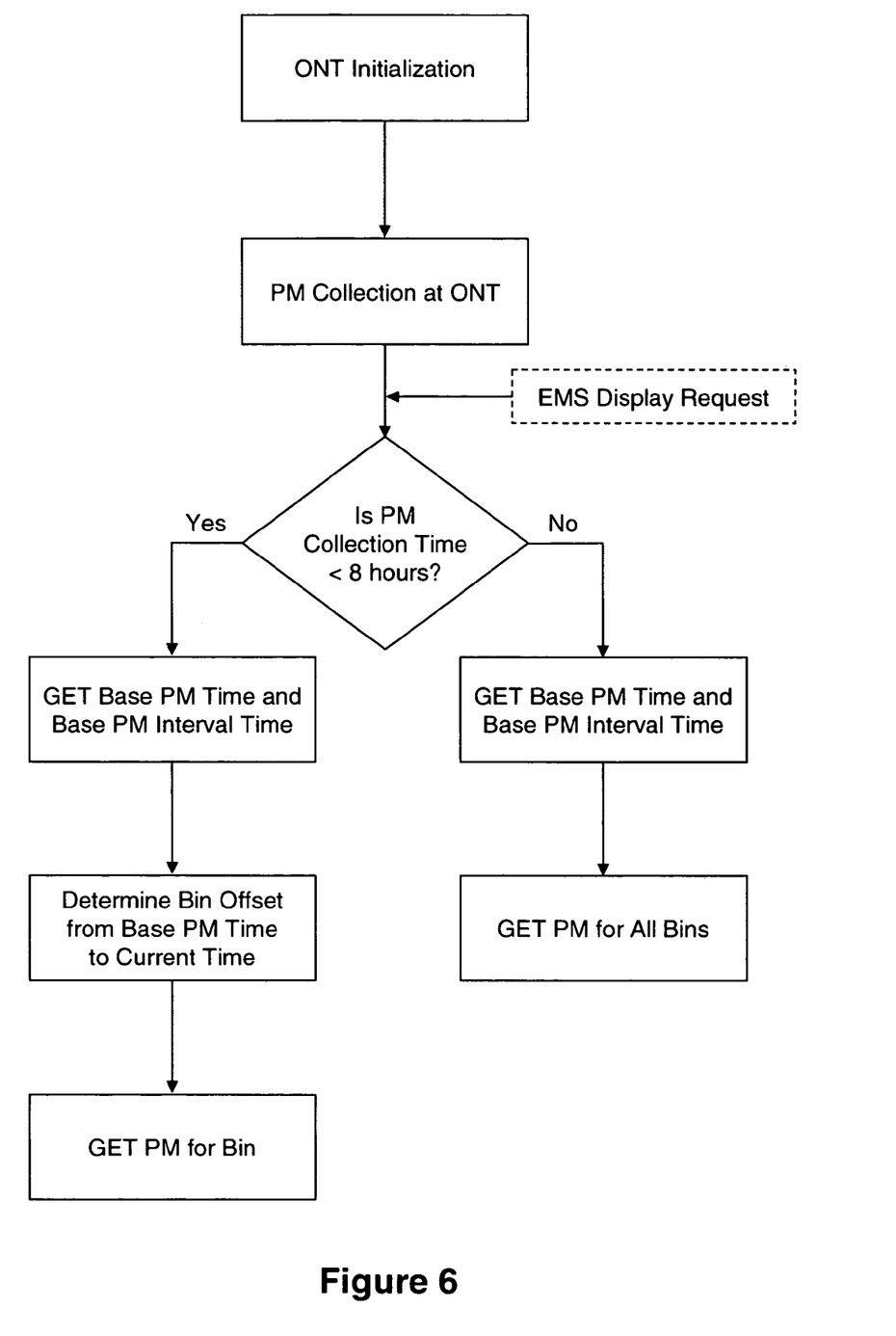
FIG. 6 illustrates an exemplary flow of the PM Collection according to an embodiment of the present invention.

FIG. 6 illustrates an exemplary flow of the PM Collection according to an embodiment of the present invention. As shown in FIG. 6, the ONT can begin PM collection after it receives the PM Initialization Time from the OLT (e.g., the System Time). This message can be sent by the PON card at the OLT (or from the EMS) immediately after the ONT has been ranged. The message used to send the system time to the ONT can, for example, be of the form:

SET=>ME: attributes: Time (4 bytes).

After the ONT is initialized (i.e., receives the SET message from the OLT), it can set its Base PM Time to the nearest previous 15-min interval. For example, at 8:47 A.M., the OLT sends the SET message to the ONT. The ONT then sets its Base PM Time to 8:45 A.M., the most recent 15-min. bin interval. At the same time, the ONT can set (or resets) its Base PM Interval Time to 0×00. Once this series of steps is accomplished, the ONT can begin PM collection.

In this exemplary embodiment, to display PM collected by the ONT for less than 8 hours, the EMS (or OLT, etc.) should first request the Base PM Time and the Base PM Interval Time from the ONT. Based on these two values, the EMS will be able to request and display the appropriate counter(s). Thus, from the perspective of the EMS, an exemplary sequence of events might be: (1) EMS Sends a GET "Managed Entity" attribute(s) message to the ONT to retrieve the Base PM Time and the Base PM Interval Time, and (2) based on these values, the EMS can have knowledge of the oldest available 15-minute bin, and the applicable Interval & Time value associated with it.

For example, continuing the example above, if the user at the EMS wants to display PM collection data at 12:03 P.M. (e.g., the current time or system time), the user will first send a GET "Managed Entity" message to the ONT, at which point the ONT might respond with the following information:

BASE Time Attribute=8:45 A.M.
BASE Interval Attribute: 0×00

From this information, the EMS can display the 15-min intervals from 8:45 A.M. to 12:03 P.M. without any problems. For each 15-min interval, the EMS can send a request to retrieve the applicable information from the ONT, but the "interval end time" attribute values for the given 15-min interval are static and associated with the same time & the EMS only needs to know what the offset interval end time value is between the Base PM time (e.g., the 8:45 A.M. time) and the current system time (i.e., the 12:03 P.M. time in the example).

In this exemplary embodiment, after the ONT has been collecting PM for 8 hours or more, it will update its BASE Time attribute after the completion of every 15-min interval thereafter. Thus, for example, assume that the current time is 7:55 P.M. and that the Base time attribute for a given ME is set to 12:00 P.M. (e.g. about 8 hours back). Also, assume that the associated Base PM Interval attribute value for that ME is 16, Given this example, when the current time reaches 8:00 P.M., the Base PM Time attribute will automatically be incremented to 12:15 P.M. and the Base Interval attribute will increment to 17.

So, continuing with this example, if at 8:03 P.M. a user desires to list the previous 8 hours worth of bins at the EMS, the EMS can be instructed to as follows. The user can first send a message to GET the ME attributes and retrieve the Base PM Time Attribute (e.g., 12:15 P.M. in this example) and the Base PM Interval Time (e.g., 17 in this example). Then, based on these values the EMS will begin sending requests (e.g., 32 in all for this example) for each 15-min. BIN up to the 8:00 interval. So, the Interval End Time in each PM request message from the EMS will have the following sequence: 17, 18, 19, 20, 21, 22, 23, 24, 25, 26, 27, 28, 29, 30, 31, 0, 1, 2, 3, 4, 5, 6, 7, 8, 9, 10, 11, 12, 13, 14, 15, 16. As can be seen, the sequence of values for the wraps at 31, So, the Interval 17 corresponds to 12:15 P.M., whereas the Interval 15 corresponds to 7:45 P.M., and Interval 16 corresponds to 8:00 P.M.

Although the present invention has been particularly described with reference to the preferred embodiments thereof, it should be readily apparent to those of ordinary skill in the art that changes and modifications in the form and details thereof may be made without departing from the spirit and scope of the invention. For example, those skilled in the art will understand that variations can be made in the number and arrangement of components illustrated in the above block diagrams, as well as the order and combination of steps in the flows. It is intended that the appended claims include such changes and modifications.

We claim:

1. A method of performance monitoring (PM) in a passive optical network that includes at least one optical line terminator (OLT) and at least one optical network terminal (ONT), the method comprising the steps of:
    setting a PM initialization time at the ONT;
    maintaining a base PM time at the ONT;
    zeroing an interval end time counter at the ONT; and
    collecting first PM data in one of a plurality of PM bins for a PM time interval.

2. The method according to claim 1, wherein the PM initialization time is set by the OLT to a system time.

3. The method according to claim 2, wherein the system time is set during at least one of an ONT ranging and an ONT PM counter initialization.

4. The method according to claim 1, wherein the base PM time is a most recent PM interval start time with respect to the PM initialization time of the ONT.

5. The method according to claim 1, wherein the interval end time counter increments upon completion of collecting the first PM data for the PM time interval.

6. The method according to claim 5, wherein the interval end time counter is a cyclic counter.

7. The method according to claim 1, wherein the plurality of PM bins equals 32 PM bins.

8. The method according to claim 7, wherein the PM time interval is 15 minutes.

9. The method according to claim 1, further comprising the steps of:
    incrementing the interval end time counter upon completion of collecting the first PM data for the PM time interval; and
    collecting more PM data in another of the plurality of PM bins for the PM time interval.

10. The method according to claim 9, wherein the interval end time counter is a cyclic counter.

11. The method according to claim 9, wherein the plurality of PM bins equals 32 PM bins.

12. The method according to claim 11, wherein the PM time interval is 15 minutes.

13. The method according to claim 9, further comprising the step of, after the step of collecting more PM data, repeating the steps of incrementing and collecting more.

14. The method according to claim 13, wherein the interval end time counter is a cyclic counter.

15. The method according to claim 13, wherein the plurality of PM bins equals 32 PM bins.

16. The method according to claim 15, wherein the PM time interval is 15 minutes.

17. The method according to claim 1, further comprising the steps of, after the step of collecting first PM data:
    getting the PM initialization time and the base PM time from the ONT at the OLT; and
    getting the first PM data from the one of the plurality of PM bins.

18. The method according to claim 9, further comprising the steps of, after the step of collecting more PM data:
    getting the PM initialization time and the base PM time from the ONT at the OLT;
    determining a PM bin offset; and
    getting the more PM data from the another of the plurality of PM bins based on the PM bin offset.

19. The method according to claim 18, wherein determining the PM bin offset includes taking the difference between a system time and the base PM time.

20. The method according to claim 13, further comprising the steps of, after the step of collecting more PM data:
    getting the PM initialization time and the base PM time from the ONT at the OLT;
    determining a PM bin offset;
    getting the interval end time counter from the ONT at the OLT;
    getting the more PM data from the another of the plurality of PM bins based on the interval end time counter.

21. The method according to claim 20, wherein determining the PM bin offset includes taking the difference between a system time and the base PM time.

22. The method according to claim 20, wherein the interval end time counter is a cyclic counter.

23. The method according to claim 22, wherein getting the more PM data includes cycling through the interval end time counter.

24. A system for performance monitoring (PM) in a passive optical network that includes at least one optical line terminator (OLT) and at least one optical network terminal (ONT), the system comprising the steps of:
    means for setting a PM initialization time at the ONT;
    means for maintaining a base PM time at the ONT;
    means for zeroing an interval end time counter at the ONT; and
    means for collecting first PM data in one of a plurality of PM bins for a PM time interval.

25. The system according to claim 24, wherein the PM initialization time is set by the OLT to a system time.

26. The system according to claim 25, wherein the system time is set during at least one of an ONT ranging and an ONT PM counter initialization.

27. The system according to claim 24, wherein the base PM time is a most recent PM interval start time with respect to the PM initialization time of the ONT.

28. The system according to claim 24, wherein the interval end time counter increments upon completion of collecting the first PM data for the PM time interval.

29. The system according to claim 28, wherein the interval end time counter is a cyclic counter.

30. The system according to claim 24, wherein the plurality of PM bins equals 32 PM bins.

31. The system according to claim 30, wherein the PM time interval is 15 minutes.

32. The system according to claim 24, further comprising:
    means for incrementing the interval end time counter upon completion of collecting the first PM data for the PM time interval; and
    means for collecting more PM data in another of the plurality of PM bins for the PM time interval.

33. The system according to claim 32, wherein the interval end time counter is a cyclic counter.

34. The system according to claim 32, wherein the plurality of PM bins equals 32 PM bins.

35. The system according to claim 34, wherein the PM time interval is 15 minutes.

36. The system according to claim 32, further comprising, after the means for collecting more PM data, a means for repeating the steps of incrementing and collecting more.

37. The system according to claim 36, wherein the interval end time counter is a cyclic counter.

38. The system according to claim 36, wherein the plurality of PM bins equals 32 PM bins.

39. The system according to claim 38, wherein the PM time interval is 15 minutes.

40. The system according to claim 24, further comprising, after the step of collecting first PM data:
  means for getting the PM initialization time and the base PM time from the ONT at the OLT; and
  means for getting the first PM data from the one of the plurality of PM bins.

41. The system according to claim 32, further comprising, after the step of collecting more PM data:
  means for getting the PM initialization time and the base PM time from the ONT at the OLT;
  means for determining a PM bin offset; and
  means for getting the more PM data from the another of the plurality of PM bins based on the PM bin offset.

42. The system according to claim 41, wherein determining the PM bin offset includes taking the difference between a system time and the base PM time.

43. The system according to claim 36, further comprising, after the step of collecting more PM data:
  means for getting the PM initialization time and the base PM time from the ONT at the OLT;
  means for determining a PM bin offset;
  means for getting the interval end time counter from the ONT at the OLT;
  means for getting the more PM data from the another of the plurality of PM bins based on the interval end time counter.

44. The system according to claim 43, wherein determining the PM bin offset includes taking the difference between a system time and the base PM time.

45. The system according to claim 43, wherein the interval end time counter is a cyclic counter.

46. The system according to claim 45, wherein getting the more PM data includes cycling through the interval end time counter.

47. A passive optical network (PON) that uses a system time for performance monitoring (PM) of the PON comprising:
  at least one optical network terminal (ONT), the ONT including a PM initialization time,
  a base PM time, a plurality of PM bins and an interval end time counter; and
  at least one optical line terminator (OLT), the OLT including the system time; and
  wherein:
    the OLT is coupled to the ONT via the PON;
    the OLT is configured to set the PM initialization time of the ONT using the system time; and
    the ONT is configured to maintain the base PM time, initialize an interval end time counter and collect a first set of PM data for a PM time interval in one of the plurality of PM bins.

48. The network according to claim 47, wherein the ONT is further configured to set the base PM time to a most recent PM interval start time with respect to the PM initialization time.

49. The network according to claim 47, wherein the ONT is further configured to increment the interval end time counter upon completion of collecting the set of first PM data.

50. The network according to claim 49, wherein, after interval end time counter is incremented, the ONT is further configured to collect more sets of PM data in other of the plurality of PM bins for the PM time interval and to increment the interval end time counter upon completion of collecting more sets of first PM data.

51. The network according to claim 47, wherein, after the first set of PM data is collected, the OLT is further configured to retrieve the PM initialization time, the base PM time and the first set of PM data from the ONT.

52. The network according to claim 50, wherein, after the more sets of PM data are collected, the OLT is further configured to retrieve the PM initialization time, the base PM time and any of the sets of PM data from the ONT.

53. The method according to claim 1, wherein the PM initialization time is set after the ONT has been ranged.

54. The method according to claim 24, wherein the PM initialization time is set alter the ONT has been ranged.

55. The method according to claim 47, wherein the PM initialization time is set after the ONT has been ranged.

* * * * *